(12) United States Patent
Banerjee et al.

(10) Patent No.: US 11,962,516 B1
(45) Date of Patent: Apr. 16, 2024

(54) PACKET DEDUPLICATION

(71) Applicant: Cisco Technology, Inc., San Jose, CA (US)

(72) Inventors: Ayan Banerjee, Fremont, CA (US); Saikat Bhattacharya, San Francisco, CA (US); Ramesh Sivakolundu, Saratoga, CA (US); Ravikanth Nasika, Fremont, CA (US); Rajesh Sharma, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/162,173

(22) Filed: Jan. 31, 2023

(51) Int. Cl.
*H04L 49/00* (2022.01)
*H04L 43/028* (2022.01)
*H04L 43/12* (2022.01)
*H04L 45/7453* (2022.01)

(52) U.S. Cl.
CPC ............ *H04L 49/30* (2013.01); *H04L 43/028* (2013.01); *H04L 43/12* (2013.01); *H04L 45/7453* (2013.01)

(58) Field of Classification Search
CPC ....... H04L 49/30; H04L 49/00; H04L 49/552; H04L 43/12; H04L 69/22; H04L 43/028; H04L 47/125; H04J 11/00
See application file for complete search history.

(56) References Cited

U.S. PATENT DOCUMENTS

| | | | |
|---|---|---|---|
| 9,262,431 B2 | 2/2016 | Kolodner et al. | |
| 9,674,074 B2 | 6/2017 | Nguyen | |
| 10,320,568 B1 | 6/2019 | Mao et al. | |
| 11,405,289 B2 | 8/2022 | Rao | |
| 2011/0206055 A1* | 8/2011 | Leong | H04L 49/30 370/401 |
| 2012/0271798 A1 | 10/2012 | Hirsch | |
| 2015/0019507 A1 | 1/2015 | Aronovich | |
| 2016/0323166 A1 | 11/2016 | Pandey et al. | |
| 2017/0103068 A1 | 4/2017 | Araki et al. | |
| 2019/0149437 A1* | 5/2019 | Hegde | H04L 43/12 370/252 |
| 2019/0334727 A1 | 10/2019 | Kaufman | |

OTHER PUBLICATIONS

Kirsch, A., et al, "Hash-Based Techniques for High-Speed Packet Processing," Semanticscholar, https://www.eecs.harvard.edu/~michaelm/postscripts/dimacs-chapter-08.pdf, retrieved Nov. 24, 2022, 40 pages.

* cited by examiner

*Primary Examiner* — Kyung H Shin
(74) *Attorney, Agent, or Firm* — Edell, Shapiro & Finnan, LLC (57) ABSTRACT

Techniques to eliminate duplicate packets from a stream of packets. A method includes receiving a packet, hashing elements of the packet to obtain a packet partial signature, generating an action data value by appending, to the packet partial signature, unhashed packet information, accessing a hash store location in a hash store based on the action data value, determining, based on data stored at the hash store location, whether the packet is a duplicate of a previously-received packet, and based on whether the packet is a duplicate of a previously-received packet, one of allowing and preventing one of the packet and a copy of the packet to reach a downstream network node.

20 Claims, 6 Drawing Sheets

FIG.1

| PACKET ELEMENT | BITS |
|---|---|
| src_ip | 128 |
| dst_ip | 128 |
| L4_src_prt | 16 |
| L4_dst_prt | 16 |
| ip_proto | 8 |
| DEDUP_TENANCY_TAG | 32 |
| PACKET PAYLOAD | VARIABLE |
| INNER PAYLOAD ID | 32 |
| TOTAL BITS | 360 |
| PACKET PARTIAL SIGNATURE | 128 |

| PARAMETER | BITS | POSSIBLE VALUES/COMMENTS |
|---|---|---|
| DEDUP_TENANCY_TAG | 32 | NATIVE PKT – INNER VLAN<br>VXLAN – INNER VNI<br>GRE – KEY_ID<br>MPLS – INNERMOST LABEL |
| PKT-TYPE | 4 | NATIVE, VXLAN, GRE, MPLS |
| PROTOCOL TYPE | 4 | TCP, UDP |
| PACKET LENGTH | 8 | IN MULTIPLES OF 64 BYTES |
| PACKET DATA | 31 | UP TO 4 BYTES OF PACKET DATA |
| TIMESTAMP WRAP-AROUND STATUS | 1 | FLAG TO INDICATE WRAP AROUND OF TIMESTAMP + DEDUP WINDOW |
| ADDITIONAL PACKET PARAMETERS | 80 | TOTAL BITS |

| | CH1 | | CH2 |
|---|---|---|---|
| ADDRESS 31 | TIMESTAMP T1 (TIMESTAMP T3) | PACKET PARTIAL SIGNATURE (AND ADDITIONAL PACKET PARAMETERS) | |
| ADDRESS 32 | TIMESTAMP T2 | | |
| | | | |

PACKET DEDUPLICATION

TECHNICAL FIELD

The present disclosure relates to deduplicating packets, particularly streaming network packets.

BACKGROUND

Deduplication is a method by which redundant data is deleted or eliminated to save storage space and/or to facilitate subsequent processing of data. In the networking space, it is sometimes desirable to deduplicate streaming network packets before sending the stream of packets (or a subset thereof) to tools for a variety of observability tasks, such as intrusion detection. That is, it may be undesirable to process streaming duplicated packets for such observability tasks since inaccurate, or false positive, results might be generated. Additionally, duplicate packets can lead to redundant processing and, thus, by deduplicating packets, it is possible, e.g., to alleviate denial of service attacks.

Packet deduplication is traditionally performed in software. However, the throughput of a software-centric deduplication process is dependent on the number of central processing unit (CPU) cores in a server executing the software. A typical software one rack-unit (1 RU) server can process 5-10G/core of throughput, for a total of, e.g., 200G for a 20-core server. The maximum throughput may also be constrained by the Peripheral Component Interconnect Express (PCIe) bandwidth between network interface cards (NICs) and the CPU complex, i.e., the collection of CPU cores.

DETAILED DESCRIPTION

Overview

Techniques to eliminate duplicate packets from a stream of packets are presented. A method includes receiving a packet, hashing elements of the packet to obtain a packet partial signature, generating an action data value by appending, to the packet partial signature, unhashed packet information, accessing a hash store location in a hash store based on the action data value, determining, based on data stored at the hash store location, whether the packet is a duplicate of a previously-received packet, and based on whether the packet is a duplicate of a previously-received packet, one of allowing and preventing one of the packet and a copy of the packet to reach a downstream network node.

In another embodiment, a device is provided. The device includes an interface configured to enable network communications, a memory, and one or more processors coupled to the interface and the memory, and configured to: receive a packet, hash elements of the packet to obtain a packet partial signature, generate an action data value by appending, to the packet partial signature, unhashed packet information, access a hash store location in a hash store based on the action data value, determine, based on data stored at the hash store location, whether the packet is a duplicate of a previously-received packet, and based on whether the packet is a duplicate of a previously-received packet, one of allow and prevent one of the packet and a copy of the packet to reach a downstream network node.

Example Embodiments

Figure 1:
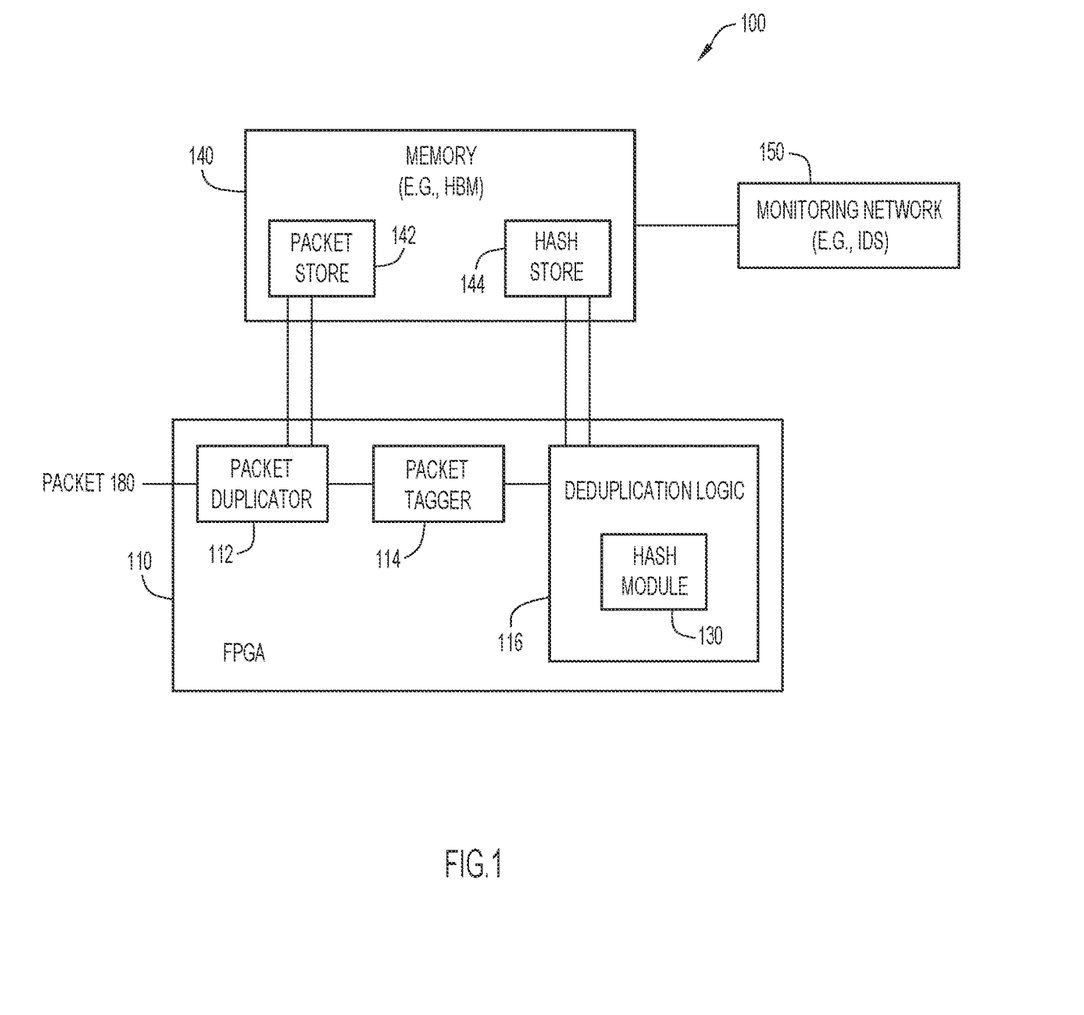
FIG. 1 shows a system including deduplication logic, according to an example embodiment.

FIG. 1 shows a system 100 including deduplication logic 116, according to an example embodiment. More specifically, in one possible implementation, deduplication functionality is implemented in hardware, such as with a field programmable gate array, or FPGA 110. FPGA 110 may include a packet duplicator 112, a packet tagger 114, and deduplication logic 116, which may include a hash module 130. As further shown in FIG. 1, packet duplicator 112 is in communication with memory 140, such as high bandwidth memory (HBM) and, in particular, a packet store 142, which operates as a buffer while a packet 180 is processed to determine whether the packet 180 is a duplicate packet of a previously-received packet and should, accordingly, be deleted or dropped for purposes of, e.g., forwarding the packet 180 to a monitoring network 150, such as an intrusion detection system (IDS).

As shown, hash module 130 is also in communication with memory 140, particularly a hash store 144 in memory 140.

At a high level, packet 180 is received at packet duplicator 112 where a copy of packet 180 is made. The copy of packet 180 is forwarded to packet store 142 for at least a time period sufficient to complete a check as to whether packet 180 is a duplicate of another packet that has been previously processed, perhaps within a predetermined time window, e.g., 10 seconds, 5 seconds, 1 second, 10 ms, 5 ms, etc. If it is determined by deduplication logic 116 that packet 180 is a duplicate of a prior (e.g., streamed) packet, then the copy of packet 180, stored in packet store 142 is dropped, deleted, etc., and not forwarded to monitoring network 150 (or other network node) for further analysis/processing. On the other hand, if it is determined by deduplication logic 116 that packet 180 is not a "recent" duplicate, i.e., packet 180 was not received within the predetermined time window, then the copy of packet 180 stored in packet store 142 of memory 140 is sent to monitoring network 150 or, generally, to another node in a network. A goal of the deduplication function of the present embodiments is to reduce the possibility that monitoring network 150 (or some other downstream network node) is overwhelmed or supplied with unnecessary duplicate packets to analyze or process.

Those skilled in the art will appreciate that packets received at packet duplicator 112 may come from various locations inside and outside a given enterprise. For example, packets may be received via a firewall (not shown) or from, e.g., a switch deployed inside a given enterprise that is protected by the firewall.

Still with reference to FIG. 1, packet 180, after/while a copy thereof was/is being duplicated for buffering in packet store 142, is passed to packet tagger 114. Packet tagger 114 is configured to apply a rule to packet 180 to determine, e.g., how packet 180 is to be analyzed by deduplication logic 116. For example, packet 180 may be determined by packet tagger 114 to be an HTTP packet, and thus a 10 ms predetermined time window may be indicated, or packet 180 may be determined by packet tagger 114 to be data associated with, e.g., a financial transaction, and thus a 5 ms predetermined time window may be indicated. Those skilled in the art will appreciate that the foregoing time windows are merely examples, and other rules could be applied to packet 180 to control how packet 180 is processed by deduplication logic 116.

Figure 2A:
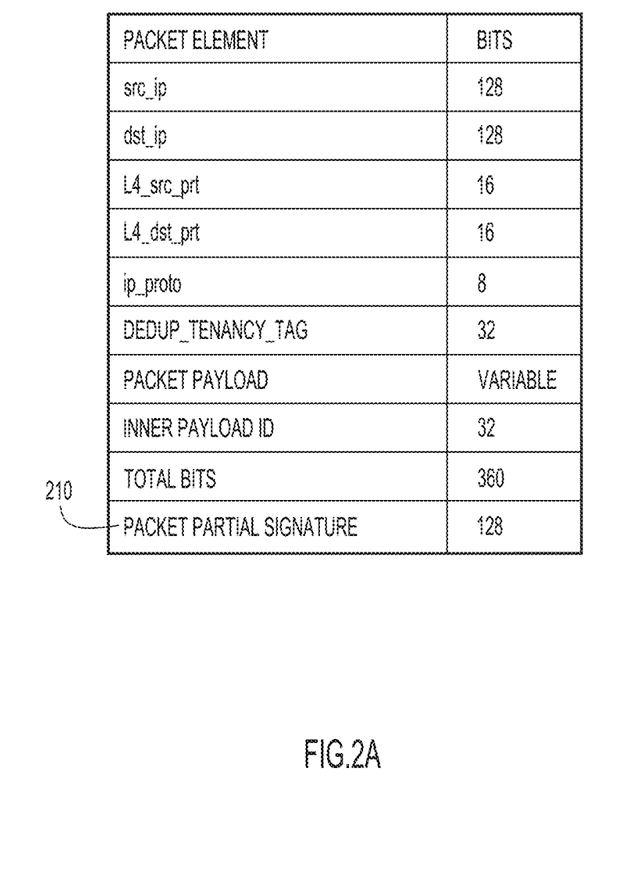
FIG. 2A shows example parameters used to create a packet partial signature based on a hash of elements of a given packet, according to an example embodiment.

When packet 180 reaches deduplication logic 116, a hash of aspects of the packet are executed by hash module 130. Specifically, FIG. 2A shows example parameters used to create a "packet partial signature" 210 based on a hash of elements of packet 180 (and other packets to be processed by system 100), according to an example embodiment. As shown in FIG. 2A, packet elements collected for hashing may include source IP address (src_ip), destination IP address (dst_ip), layer 4 source port (l4_src_port), layer 4 destination port (l4_dst_port), IP protocol (ip_proto), a deduplication tenancy tag (dedup tenancy tag), explained below, and an inner payload ID generated, e.g., by a running counter, resulting in a total of 360 bits of data, as indicated. In the instant specific implementation, the payload of packet 180 is not a parameter collected for purposes of generating a "packet partial signature" 210. On the other hand, in other embodiments, the payload or portions thereof may be used to generate the packet partial signature 210.

In another possible embodiment, if Layer 2 (L2) packets are being processed, then source media access control address (src_mac), destination media access control address (dst_mac), and ethernet type (ether_type) may be used as input to hash module 130.

The collection of 360 bits of data (or some other set of predetermined data from packet 180) is then hashed by hash module 130, which may execute, e.g., the XX-HASH, or some other hash function, to reduce the amount of data to, e.g., 128 bits (or some other predetermined number of bits) to obtain the packet partial signature 210.

Figure 2B:
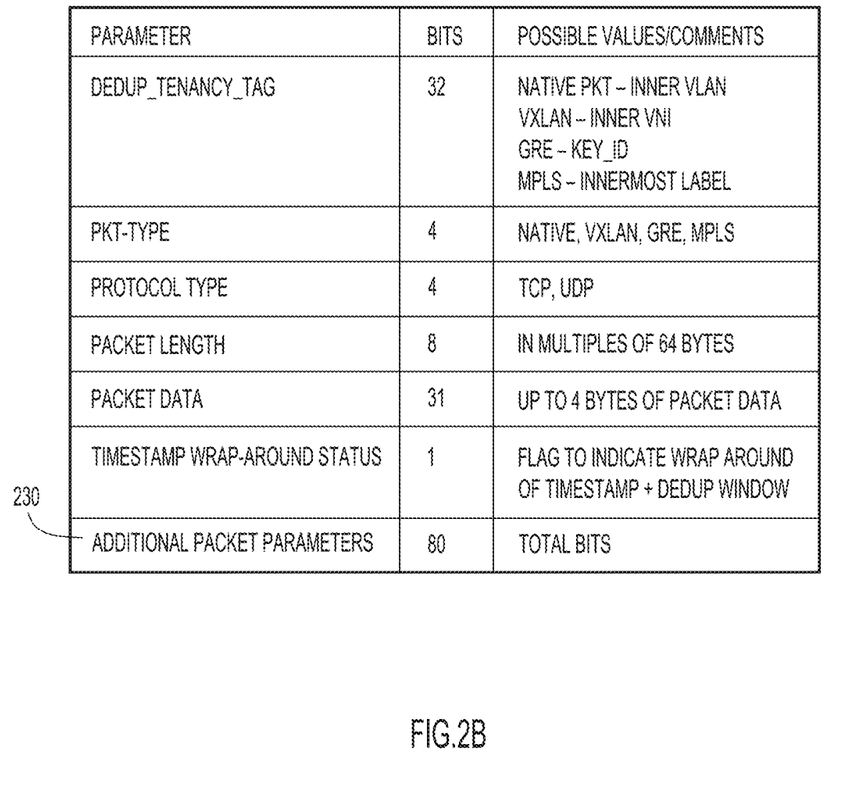
FIG. 2B shows additional parameters used to augment the packet partial signature, according to an example embodiment.

FIG. 2B shows parameters collected for additional packet parameters 230 used to augment the packet partial signature 210, according to an example embodiment. That is, once packet partial signature 210 is generated, additional data is appended thereto to better ensure the uniqueness of the data that ultimately represents packet 180 in connection with determining whether packet 180 has been processed recently (e.g., within the predetermined time window), and thus considered a duplicate. As shown, the additional packet parameters 230 may include a deduplication tenancy tag (e.g., for a native packet an inner VLAN ID, for a VXLAN packet an inner VNI, for a generic routing encapsulated (GRE) packet a Key ID, and for an MPLS packet an innermost label), packet type, (e.g., native, VXLAN, GRE, MPLS), a protocol type (e.g., TCP, UDP), a packet length (e.g., in multiples of 64 bytes), a predetermined amount of packet data (e.g., up to 4 bytes), and, in some implementations, a flag to indicate a wrap around timestamp and deduplication window. For example, the noted flag may be used in the event an N-bit counter rolls over and to adjust timing calculations accordingly.

In an embodiment, as shown in FIG. 2B, the additional packet parameters 230 amount to a total of 80 bits of data. Those skilled in the art will appreciate that other bit totals could be implemented for the additional packet parameters 230.

Figure 2C:
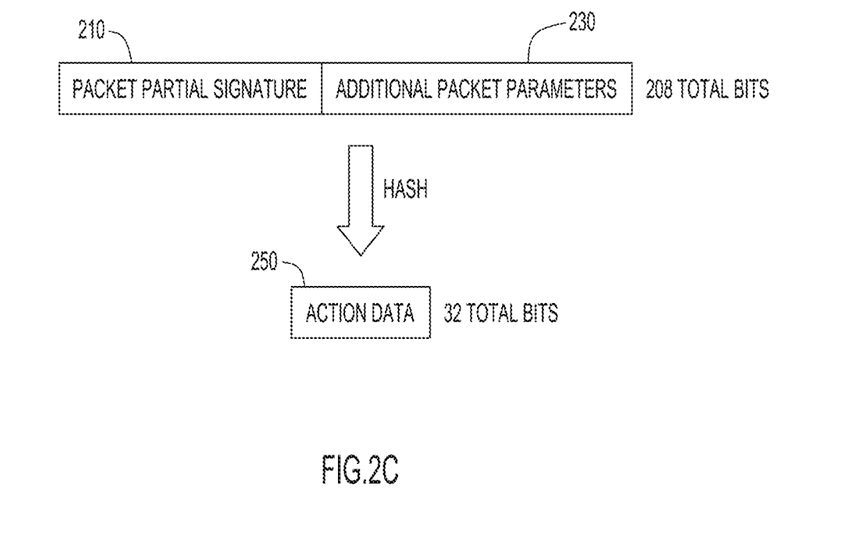
FIG. 2C shows a combination of the packet partial signature and additional packet parameters that are then, together, hashed to obtain a hash store entry or memory address, according to an example embodiment.

FIG. 2C shows a combination of the packet partial signature 210 and additional packet parameters 230 that are then, together, hashed by, e.g., hash module 130 to obtain action data 250, according to an example embodiment. Given the combination of packet partial signature 210 and additional packet parameters 230, action data 250 is considered sufficiently unique to represent packet 180 and thus significantly reduce a possibility of another packet of having a same action data value as packet 180, thus reducing or eliminating potential undesirable collisions in hash store 144. In an embodiment, action data 250 is comprised of 32 bits. Of course, other bit totals for action data 250 may be employed depending on the desired implementation. The hash of the combination of packet partial signature 210 and additional packet parameters 230 may be in accordance with, e.g., the Murur hash, or any other suitable non-cryptographic hash function.

Figure 3:
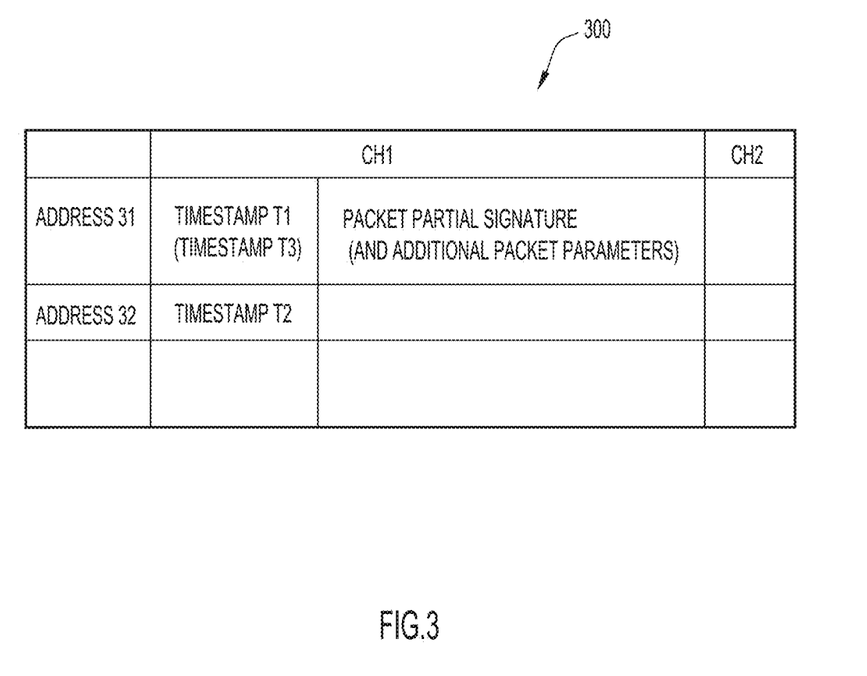
FIG. 3 shows a schematic diagram of entries in a hash store of a memory, according to an example embodiment.

FIG. 3 shows a schematic diagram or table 300 of hash store 144 as part of memory 140, according to an example embodiment. As shown, table 300 is arranged schematically with channels, e.g., CH1, CH2, etc., each having rows accessible via a given physical address, e.g., Address 31, Address 32. That is, memory 140, as a high bandwidth memory, may be configured with multiple channels, each being accessible, perhaps simultaneously. Some HBM devices may have, e.g., 4, 8, 16, 32, or 64 separately addressable channels.

As noted, in an embodiment, action data 250 is comprised of, e.g., 32 bits. These 32 bits may be used directly as an indicator for a given channel in table 300, as well as a specific physical address in table 300. Thus, for example, assume that predetermined bit locations in action data 250 corresponds to CH1 at address 31. In an implementation, a timestamp T1 corresponding to when packet 180 was first received by system 100 is stored at CH1, address 31, along with at least the packet partial signature 210 and, perhaps, also the additional packet parameters 230.

With respect to the deduplication approach described herein, there are three possible scenarios at this point. A first scenario is that a second packet received at system 100 is not a duplicate of packet 180. A second scenario is that a second packet received at system 100 is a duplicate of packet 180 and is inside the predetermined time window. And a third scenario is that the second packet received at system 100 is a duplicate of packet 180 and is outside the predetermined time window. Each scenario is discussed next.

First Scenario—Unique Second Packet

Assume that a non-duplicate second packet is received by system 100 and is processed as has been described with respect to packet 180. Because it is a non-duplicate, the value associated with the action data for the non-duplicate second packet will be different from that for packet 180, namely action data 250, and as such, a second timestamp T2 (indicative of when the non-duplicate second packet was received by system 100) is stored at, e.g., a different location, e.g., CH1, Address 32 (the address corresponding to the action data derived for the non-duplicate second packet). Those skilled in the art will appreciate that although Address 32 appears to be the next successive address (after Address 31), the location at which Timestamp T2 is stored is, in fact, dictated by the value of the action data for non-duplicate second packet, and thus could be anywhere in hash store 144.

Second Scenario—Duplicate Second Packet, within Predetermined Time Window

Now assume that a duplicate second packet is received by system 100 and is processed as has been described with respect to packet 180. Since the second packet is a duplicate, the value of the action data for the duplicate packet will be the same as action data 250. This means that the action data value for the duplicate second packet will also point to CH1, Address 31. In this case, deduplication logic 116 computes a timestamp difference between a system clock and the time the duplicate second packet was received by system 100. If the time difference is less than the predetermined time window (e.g., 10 seconds, 5 seconds, 1 second, 10 ms, 5 ms, etc.), then the duplicate second packet is deemed to be within the predetermined time window, and the copy of the duplicate second packet is dropped from packet store 142. IN another possible implementation, Timestamp T1 of packet 180 may be subtracted from the timestamp of the duplicate second packet, thus arriving at a value to compare to the predetermined time window.

Third Scenario—Duplicate Second Packet, Outside Predetermined Time Window

Assume that a duplicate second packet is received by system 100 and is processed as has been described with respect to packet 180. Since the second packet is a duplicate, the value of the action data for the duplicate packet will be the same as action data 250. This means that the action data value for the duplicate second packet will again point to CH1, Address 31. As in the second scenario, deduplication logic 116 may compute a timestamp difference between the system clock and the time the duplicate second packet was received by system 100. In this case, the time difference is more than the predetermined time window (e.g., 10 seconds, 5 seconds, 1 second, 10 ms, 5 ms, etc.). Accordingly, two actions are taken. First, the data at location CH1, Address 31 is overwritten with a Timestamp T3 that corresponds to the time the duplicate second packet was received by system 100, along with along with at least the packet partial signature for the duplicate second packet and, perhaps, also the additional packet parameters for the duplicate second packet. Second, the copy of the duplicate second packet that was stored in packet store 142 is now released, e.g., to monitoring network 150, or some other network node.

Thus, in one implementation, the embodiments described herein use High Bandwidth Memory (HBM) for a temporary cache to store packet (as opposed, e.g., to flow) signatures for the deduplication process. A hash, such as the XX-HASH, is used to compute the packet partial signature 210. To the resulting hashed value, additional packet information may be appended. That concatenated value may then be hashed again to obtain a memory channel value and/or address in the HBM, via the action data 250.

As noted previously, HBM often has multiple access channels. In one embodiment, the number of channels used for a given HBM device may be optimized based on desired throughput. For example, in one implementation, the use of 8 channels (out of, e.g., 32 channels) allows for temporary skew of the input hash not being perfectly distributed across the channels. Burst size may also be optimized for a particular implementation. The 8 channel choice permits support of 8*8=64M entries, and, as an example, there might be at most 2M such entries over a window. Any reasonable hash function would have a (2M/64M=) 3.125% efficiency. The described use of XX-HASH meets this efficiency. For 4 entries per hash bucket, with allocation priority from left to right, it can be shown that the number of packets occupying the entries across all buckets, over a certain time period of line rate traffic, is approximately {167, 29, 3, 1}. The overflow (hash collision, implying a bucket with all 4 entries occupied) rates are also far less than 1% for a large scale simulation. Note that for the deduplication scenario there is a temporal parameter associated with these hash buckets.

Also described herein is a feature that may be referred to as a "lazy" method for updating entries in hash store 144. Instead of running a timer and verifying and keeping entries in the memory available for use (a costly operation), the embodiments described herein access an entry and based on the current time of system and the timestamp that is written in the location, it is possible to determine if the given entry is a valid entry. This approach radically improves the performance because a location to be used is checked dynamically only during its use. It also helps in addressing the use of multiple deduplication policies with different windowing policies are served using the same global memory space.

In order to process deduplication for a high packet rate (200+ Gbps, 200+ Mpps) in hardware, the packets are stored in packet store 142 at that rate as well until a deduplication result is determined. An optimal number of HBM channels and access burst size for this function may also be selected. In one implementation, it was determined that 4 HBM channels with a burst size of 16 would be optimal in order to meet a desired data rate without dropping packets.

Figure 4:
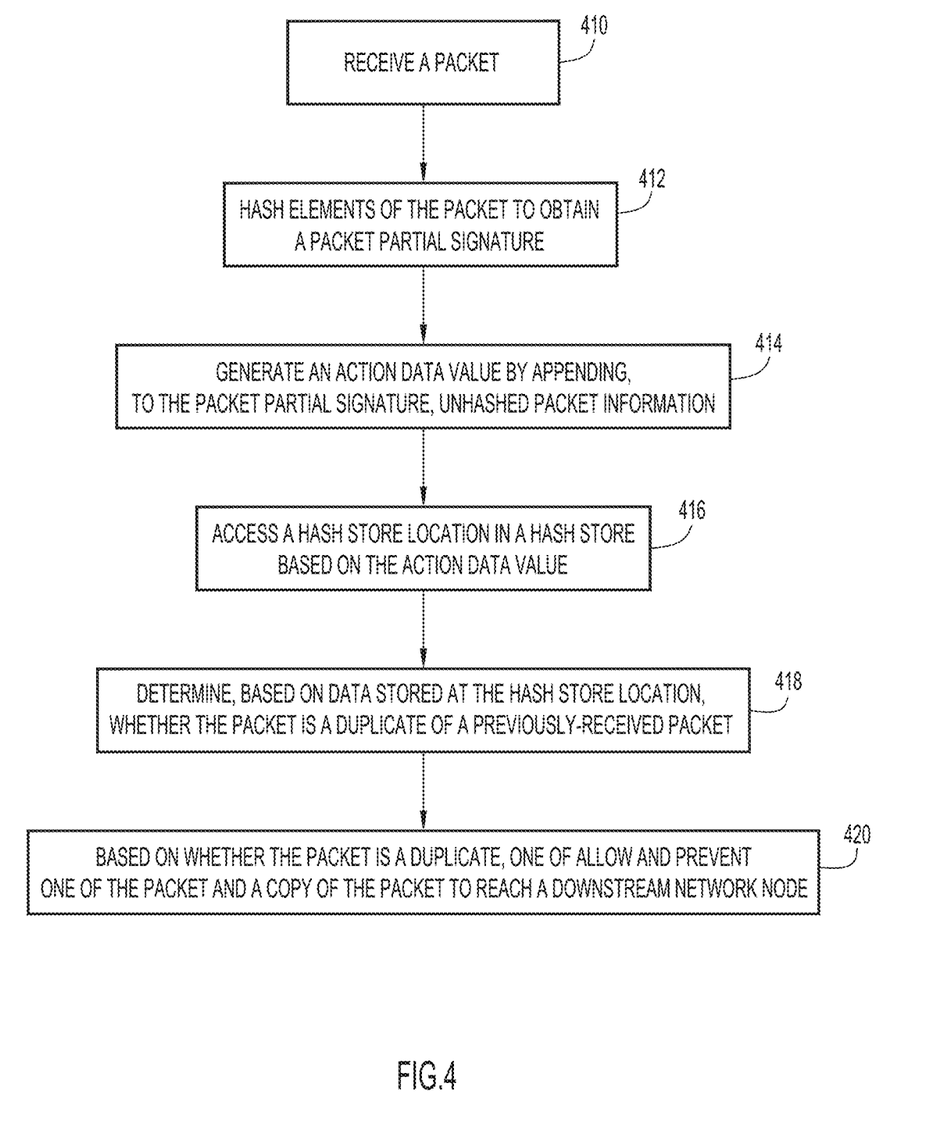
FIG. 4 shows a series of operations implemented to perform deduplication of packets, according to an example embodiment.

FIG. 4 shows a series of operations implemented to perform deduplication of packets, according to an example embodiment. An operation is configured, at 410, to receive a packet. At 412, an operation is configured to hash elements of the packet to obtain a packet partial signature. At 414, an operation is configured to generate an action data value by appending, to the packet partial signature, unhashed packet information. At 416, an operation in configured to access a hash store location in a hash store based on the action data value. At 418, an operation is configured to determine, based on data stored at the hash store location, whether the packet is a duplicate of a previously-received packet. And at 420, an operation is configured to, based on whether the packet is a duplicate of a previously-received packet, one of allow and prevent one of the packet and a copy of the packet to reach a downstream network node.

Figure 5:
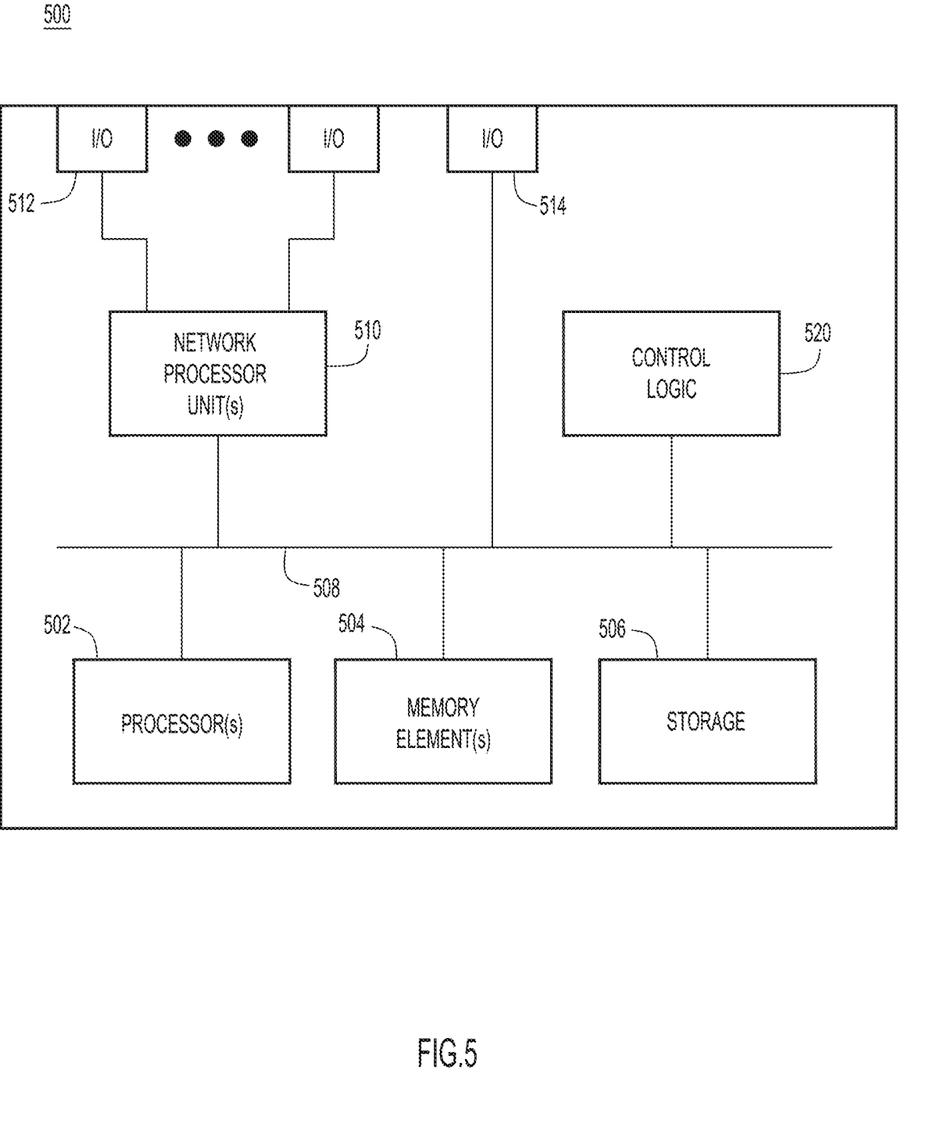
FIG. 5 is a block diagram of a computing device that may be configured to execute deduplication logic and perform the techniques described herein, according to an example embodiment.

FIG. 5 is a block diagram of a computing device that may be configured to execute deduplication logic 116 and perform the techniques described herein, according to an example embodiment. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520 (which could include, for example, deduplication logic 116. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In sum, in one embodiment a method is provided. The method may include receiving a packet, hashing elements of the packet to obtain a packet partial signature, generating an action data value by appending, to the packet partial signature, unhashed packet information, accessing a hash store location in a hash store based on the action data value, determining, based on data stored at the hash store location, whether the packet is a duplicate of a previously-received packet, and based on whether the packet is a duplicate of a previously-received packet, one of allowing and preventing one of the packet and a copy of the packet to reach a downstream network node.

In the method, the elements may include at least one of a source IP address, a destination IP address, a source port, a destination port, and an IP protocol.

In the method, the unhashed packet information may include at least one of an indication of a packet type, an indication of a protocol type, an indication of a packet length, and selected data from the packet.

In the method, the action data value may correspond to a physical address location in the hash store.

The method may further include hashing the action data value, to obtain a hashed action data value.

The method may further include selecting, based on the hashed action data value, a channel, from among a plurality of channels that provide access to the hash store, to access the hash store location.

In the method, data stored at the hash store location may include a timestamp corresponding to a time that the packet was received.

The method may further include receiving another packet and determining based on the timestamp whether the another packet is to be considered a duplicate of the packet.

The method may further include assigning a rule to the packet that defines whether the packet is a duplicate of a previously received packet.

In the method, the downstream network node comprises a streaming packet monitoring process.

A device may also be provided. The device may include an interface configured to enable network communications, a memory, and one or more processors coupled to the interface and the memory, and configured to: receive a packet, hash elements of the packet to obtain a packet partial signature, generate an action data value by appending, to the packet partial signature, unhashed packet information, access a hash store location in a hash store based on the action data value, determine, based on data stored at the hash store location, whether the packet is a duplicate of a previously-received packet, and based on whether the packet is a duplicate of a previously-received packet, one of allow and prevent one of the packet and a copy of the packet to reach a downstream network node.

In the device, the elements may include at least one of a source IP address, a destination IP address, a source port, a destination port, and an IP protocol.

In the device, the unhashed packet information may include at least one of an indication of a packet type, an indication of a protocol type, an indication of a packet length, and selected data from the packet.

In the device, the action data value may correspond to a physical address location in the hash store.

In the device, the one or more processors may be further configured to hash the action data value, to obtain a hashed action data value.

In the device, the one or more processors may be further configured to select, based on the hashed action data value, a channel, from among a plurality of channels that provide access to the hash store, to access the hash store location.

In the device, data stored at the hash store location may include a timestamp corresponding to a time that the packet was received, and wherein the one or more processors are further configured to receive another packet and determine based on the timestamp whether the another packet is to be considered a duplicate of the packet.

In still another embodiment, there is provided one or more non-transitory computer readable storage media encoded with instructions that, when executed by a processor, cause the processor to: receive a packet, hash elements of the packet to obtain a packet partial signature, generate an action data value by appending, to the packet partial signature, unhashed packet information, access a hash store location in a hash store based on the action data value, determine, based on data stored at the hash store location, whether the packet is a duplicate of a previously-received packet, and based on whether the packet is a duplicate of a previously-received packet, one of allow and prevent one of the packet and a copy of the packet to reach a downstream network node.

In an embodiment, the instructions may be further configured to hash the action data value, to obtain a hashed action data value, and to select, based on the hashed action data value, a channel, from among a plurality of channels that provide access to the hash store, to access the hash store location.

In an embodiment, data stored at the hash store location may include a timestamp corresponding to a time that the packet was received, and wherein the instructions are further configured to receive another packet and determine based on the timestamp whether the another packet is to be considered a duplicate of the packet.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method including:
receiving a packet;
hashing elements of the packet to obtain a packet partial signature;
appending, to the packet partial signature, unhashed packet information to obtain a concatenated string of the packet partial signature and the unhashed packet information;
generating an action data value by hashing the concatenated string of the packet partial signature and the unhashed packet information;
accessing a hash store location in a hash store using the action data value as an address;

determining, based on data stored at the hash store location, whether the packet is a duplicate of a previously-received packet; and based on whether the packet is a duplicate of a previously-received packet, one of allowing and preventing one of the packet and a copy of the packet to reach a downstream network node.

2. The method of claim 1, wherein the elements include at least one of a source IP address, a destination IP address, a source port, a destination port, and an IP protocol.

3. The method of claim 1, wherein the unhashed packet information includes at least one of an indication of a packet type, an indication of a protocol type, an indication of a packet length, and selected data from the packet.

4. The method of claim 1, wherein the action data value corresponds to a physical address location in the hash store.

5. The method of claim 1, further comprising hashing the action data value, to obtain a hashed action data value.

6. The method of claim 5, further comprising selecting, based on the hashed action data value, a channel, from among a plurality of channels that provide access to the hash store, to access the hash store location.

7. The method of claim 1, wherein data stored at the hash store location comprises a timestamp corresponding to a time that the packet was received.

8. The method of claim 7, further comprising receiving another packet and determining based on the timestamp whether the another packet is to be considered a duplicate of the packet.

9. The method of claim 1, further comprising assigning a rule to the packet that defines whether the packet is a duplicate of a previously received packet.

10. The method of claim 1, wherein the downstream network node comprises a streaming packet monitoring process.

11. A device comprising:
an interface configured to enable network communications;
a memory; and
one or more processors coupled to the interface and the memory, and configured to:
receive a packet;
hash elements of the packet to obtain a packet partial signature;
append, to the packet partial signature, unhashed packet information to obtain a concatenated string of the packet partial signature and the unhashed packet information;
generate an action data value by hashing the concatenated string of the packet partial signature and the unhashed packet information;
access a hash store location in a hash store using the action data value as an address;
determine, based on data stored at the hash store location, whether the packet is a duplicate of a previously-received packet; and
based on whether the packet is a duplicate of a previously-received packet, one of allow and prevent one of the packet and a copy of the packet to reach a downstream network node.

12. The device of claim 11, wherein the elements include at least one of a source IP address, a destination IP address, a source port, a destination port, and an IP protocol.

13. The device of claim 11, wherein the unhashed packet information includes at least one of an indication of a packet type, an indication of a protocol type, an indication of a packet length, and selected data from the packet.

14. The device of claim 11, wherein the action data value corresponds to a physical address location in the hash store.

15. The device of claim 11, wherein the one or more processors are further configured to hash the action data value, to obtain a hashed action data value.

16. The device of claim 15, wherein the one or more processors are further configured to select, based on the hashed action data value, a channel, from among a plurality of channels that provide access to the hash store, to access the hash store location.

17. The device of claim 11, wherein data stored at the hash store location comprises a timestamp corresponding to a time that the packet was received, and wherein the one or more processors are further configured to receive another packet and determine based on the timestamp whether the another packet is to be considered a duplicate of the packet.

18. One or more non-transitory computer readable storage media encoded with instructions that, when executed by a processor, cause the processor to:
receive a packet;
hash elements of the packet to obtain a packet partial signature;
append, to the packet partial signature, unhashed packet information to obtain a concatenated string of the packet partial signature and the unhashed packet information;
generate an action data value by hashing the concatenated string of the packet partial signature and the unhashed packet information;
access a hash store location in a hash store using the action data value as an address;
determine, based on data stored at the hash store location, whether the packet is a duplicate of a previously-received packet; and
based on whether the packet is a duplicate of a previously-received packet, one of allow and prevent one of the packet and a copy of the packet to reach a downstream network node.

19. The one or more non-transitory computer readable storage media of claim 18, wherein the instructions are further configured to hash the action data value, to obtain a hashed action data value, and to select, based on the hashed action data value, a channel, from among a plurality of channels that provide access to the hash store, to access the hash store location.

20. The one or more non-transitory computer readable storage media of claim 18, wherein data stored at the hash store location comprises a timestamp corresponding to a time that the packet was received, and wherein the instructions are further configured to receive another packet and determine based on the timestamp whether the another packet is to be considered a duplicate of the packet.

* * * * *